United States Patent [19]

Hayasaki et al.

[11] Patent Number: 5,000,218
[45] Date of Patent: Mar. 19, 1991

[54] WIRE HARNESS ARRANGEMENT OF AUTOMATIC TRANSMISSION

[75] Inventors: Koichi Hayasaki, Fujisawa; Yoshimi Iwaya, Zama; Hirofumi Okahara, Fujisawa, all of Japan

[73] Assignee: Nissan Motor Co., Ltd., Yokohama, Japan

[21] Appl. No.: 370,651

[22] Filed: Jun. 23, 1989

[30] Foreign Application Priority Data

Jun. 25, 1988 [JP] Japan ................. 63-83433

[51] Int. Cl.$^5$ ............................................. F16K 27/08
[52] U.S. Cl. ............................ 137/377; 248/49; 248/68.1
[58] Field of Search ............. 248/49, 68.1; 137/377, 137/899

[56] References Cited

U.S. PATENT DOCUMENTS

| | | | |
|---|---|---|---|
| 1,764,630 | 6/1930 | Houts | 248/49 |
| 2,182,847 | 12/1939 | Johnson | 248/68.1 |
| 2,997,531 | 8/1961 | Oldham et al. | 248/68.1 |
| 3,582,030 | 6/1971 | Barrett, Jr. | 248/68.1 |
| 3,751,575 | 8/1973 | Barb | 248/68.1 |
| 4,150,686 | 4/1979 | El Sherif et al. | 137/377 |
| 4,643,379 | 2/1987 | Potocnik | 248/49 |

Primary Examiner—A. Michael Chambers
Attorney, Agent, or Firm—Pennie & Edmonds

[57] ABSTRACT

Herein disclosed is a wire harness arrangement of an automatic transmission control valve unit. Covered wires extend from a front surface of a body of the control valve unit to a rear surface of the same through a side surface of the same. A plurality of brackets are arranged on the front surface in a manner to define therebetween at least one guide channel in and along which the wires extend. Closure arms are bolted to one of the brackets to partially cover the guide channel thereby to prevent the wires from being disengaged from the guide channel. A cover member is bolted to the side surface of the control valve unit in a manner to retain the wires at the side surface.

8 Claims, 6 Drawing Sheets

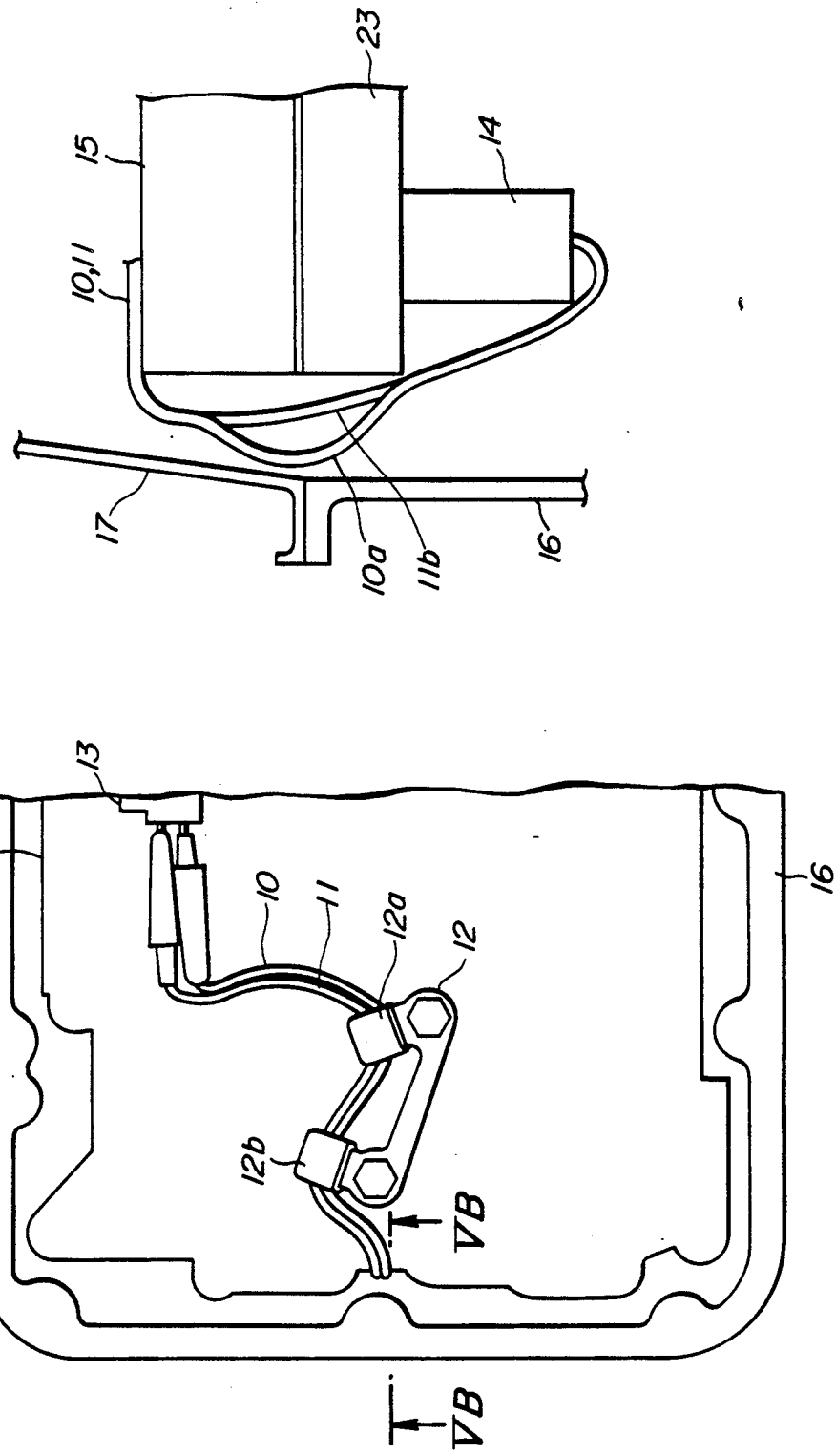

WIRE HARNESS ARRANGEMENT OF AUTOMATIC TRANSMISSION

BACKGROUND OF THE INVENTION

1. Field of the Invention

The present invention relates in general to a wire harness arrangement of a motor vehicle, and more particularly, to a wire harness arrangement for electrically connecting electric devices mounted on a control value unit of an automotive automatic transmission.

2. Description of the Prior Art

One of wire harness arrangements of the above-mentioned type is shown in the SERVICE MANUAL titled "AUTOMATIC TRANSAXLE RL4F02A TYPE" issued from NISSAN MOTOR CO., LTD in 1984.

In order to clarify the task of the present invention, the wire harness arrangements of the publication will be described withe reference to FIGS. 5A, 5B, 6A and 6B of the accompanying drawings, which arrangements are associated with an over-drive solenoid and a lock-up solenoid of the control valve unit of an automatic transmission, respectively.

FIG. 5A is a partial plan view of a control valve unit of an automatic transmission and FIG. 5B is a sectional view taken along the line VB—VB of FIG. 5A.

In these drawings, denoted by numerals 15 and 23 are upper and lower bodies of the control valve unit 10 and 11 are covered wires trailing over the surfaces of the upper and lower bodies 15 and 23, 12 is a retainer for retaining the wires 10 and 11 to upper body 15. 13 is connector mounted to upper body 15, 14 is an over-drive solenoid mounted to the lower body 23 of the valve unit. 16 is a transaxle case. 17 is a control valve cover. Each covered wire 10 and 11 comprises wires received in an insulating sleeve made of TEFLON (trade name) or the like. The retainer 12 has two spaced clips 12a and 12b by which the wires 10 and 11 are gripped. Each clip 12a or 12b is equipped with harness protector made of rubber. As is seen from FIG. 5B, the wires 10 and 11 from the connector 13 extend behind the lower body 23 and lead to the over-drive solenoid 14.

FIG. 6A is a view similar to FIG. 5B, but showing a position where covered wires associated with a lock-up solenoid 25 are arranged, and FIG. 6B is a sectional view taken along the line VIB—VIB of FIG. 6A.

In these drawings, denoted by numerals 18 to 22 are wires which extend from a connector 13' mounted on the upper body 15, go around lower body 23 and lock-up body 24 and lead to the lock-up solenoid 25. The lock-up solenoid 25 is mounted on the lock-up body 24. Denoted by numeral 12' is a retainer for gripping the wires 18 to 22. Denoted by numeral 22 is a bracket which is bolted to the upper body 15 for retaining the wires. Although not shown in the drawings, some of the wires extend to another electric device.

However, the above-mentioned wire harness arrangements have the following drawbacks due to their inherent arrangements.

First, as may be understood from FIGS. 5B and 6A, the arrangements tend to provide the wires with unsightly dangling portions. This is because of inevitable difference in length of the naked end portions of the wires, which are to be welded to the electric devices. It sometimes occurs that such dangling portions get between the transaxle case 16 and the control valve cover 17 inducing breaking thereof.

Second, due to usage of the retainers 12 and 12' by which the wires are tightly gripped, vibration of the wires, which occurs during movement of the associated motor vehicle, tend to concentrate a considerable stress on the gripped portions of the wires. This induces also breaking of the wires.

Third, if the harness protectors on the clips 12a and 12b of the retainers 12 and 12' are contaminated with oil, the gripping function of the clips becomes poor. In this case, the wires tend to slip out of the clips.

SUMMARY OF THE INVENTION

It is therefore an object of the present invention to provide a wire harness arrangement of an automatic transmission, which is free of the above-mentioned drawbacks.

According to the present invention there is provided, in a control valve assembly of an automatic transmission, a combination which comprises a body of the control valve assembly, the body having first, second and third outer surface portions; covered wires extending from the first outer surface portion to the third outer surface portion through the second outer surface portion; first means defining on the first outer surface portion at least one guide channel in and along which the wires extend; second means partially covering the guide channel to prevent the wires from being disengaged from the guide channel; and third means for retaining the wires at the second outer surface portion.

BRIEF DESCRIPTION OF THE DRAWINGS

Other objects and advantages of the present invention will become apparent from the following description when taken in conjunction with the accompanying drawings, in which:

FIG. 5A is a partial plan view of a control valve unit of an automatic transmission, to which unit a conventional wire harness arrangement associated with an over-drive solenoid is applied;

FIG. 5B is a sectional view taken along the line VB—VB of FIG. 5A;

DETAILED DESCRIPTION OF THE INVENTION

Referring to FIGS. 1, 2A, 2B, 3A and 3B, there is shown a wire harness arrangement of a first embodiment of the present invention, which is practically applied to a control valve unit of an automotive automatic transmission. The transmission is of a so-called "transversely mounted type" which is used in an FF (front-engine front-drive) type motor vehicle. It is to be noted that parts similar to those of the above-mentioned control valve unit of FIGS. 5A, 5B, 6A and 6B are denoted by the same numerals.

First, the wire harness arrangement associated with an over-drive solenoid 14 (see FIG. 2A) will be described with reference to FIGS. 1, 2A and 2B.

Figure 1:
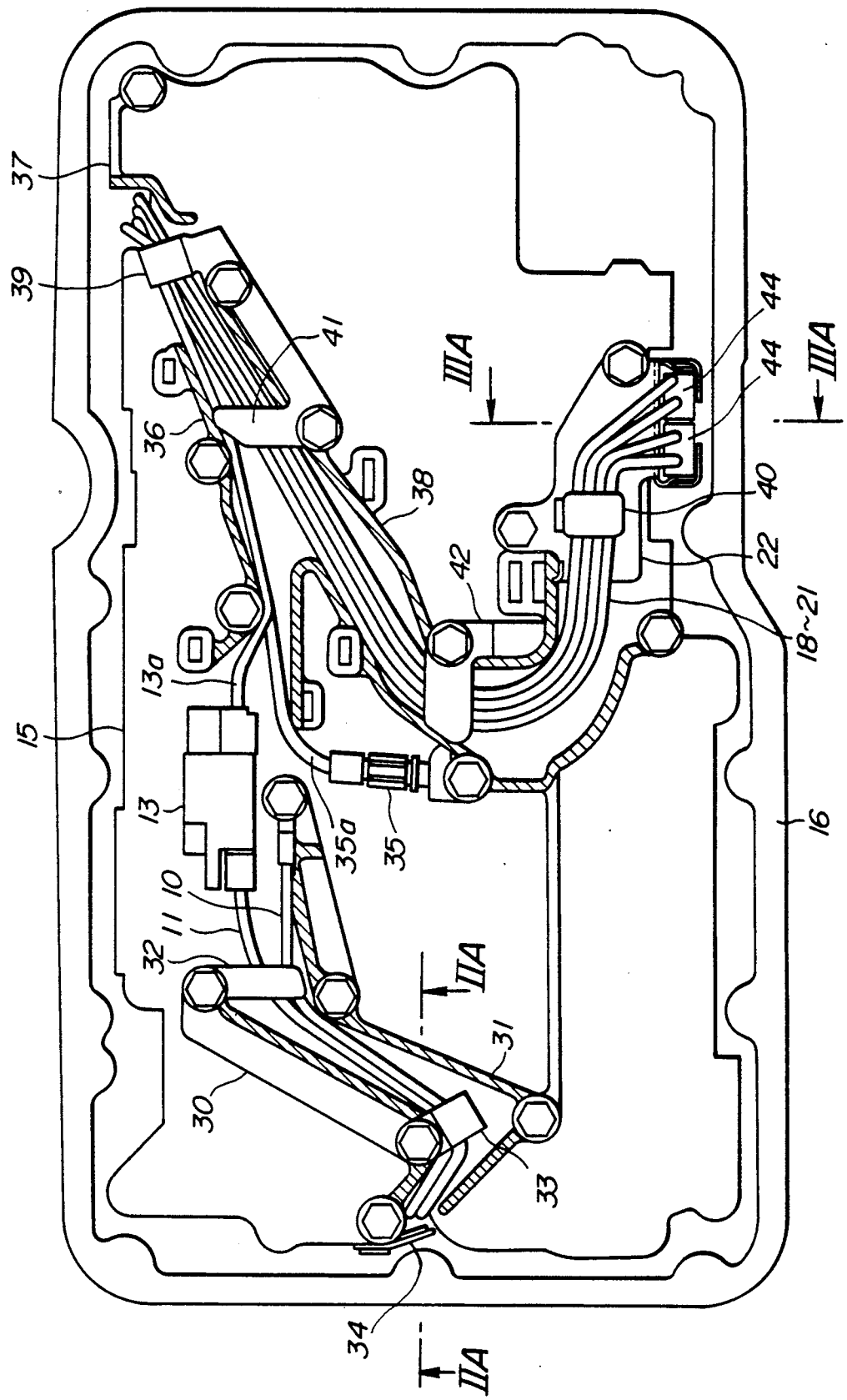
FIG. 1 is a plan view of a control valve unit of an automatic transmission, to which unit a wire harness arrangement of the present invention is applied.

As is seen from FIG. 1, two covered wires 10 and 11 extending from an earthed bolt and a connector 13 are both received in a generally Z-shaped guide channel which is defined by and between two guide brackets 30 and 31 each being bolted to the outer surface of the upper body 15. The brackets 30 and 31 have each a vertical flange which is shown crosshatched in the drawing. The flange of the guide bracket 30 has two closure arms 32 and 33 bolted thereto, by which the two wires 10 and 11 are prevented from being disengaged from the guide channel. It is to be noted that the Z-shaped channel is so sized as to facilitate a manual work for putting the wires 10 and 11 thereinto.

Figure 2A:
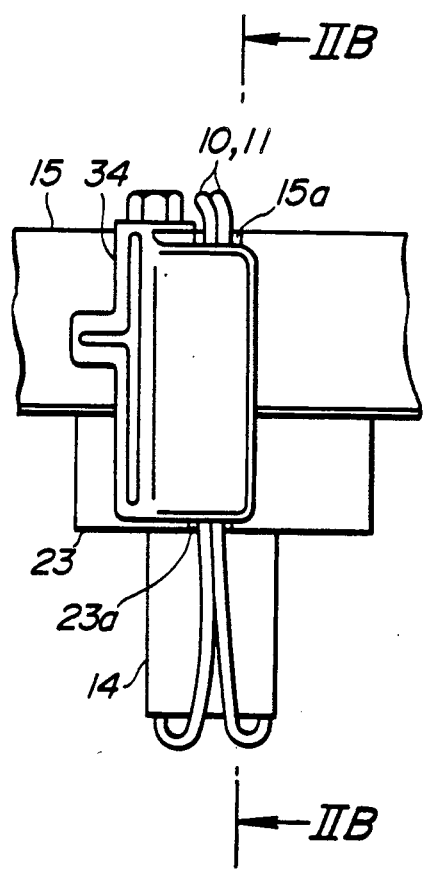
FIG. 2A is a sectional view taken along the line IIA—IIA of FIG. 1, showing a wire harness arrangement associated with an over-drive solenoid of the control valve unit.
Figure 2B:
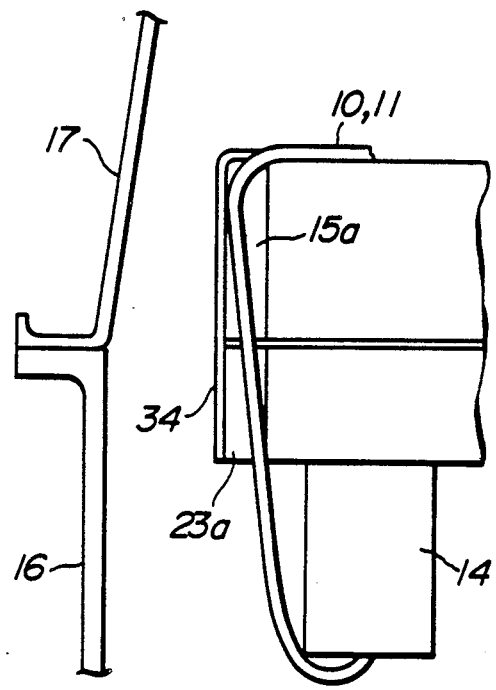
FIG. 2B is a sectional view taken along the line IIB—IIB of FIG. 2A.

As may be understood from FIGS. 2A and 2B, the upper and lower bodies 15 and 23 of the control valve unit have at their left sides aigned grooves 15a and 23a in which the two wires 10 and 11 from the Z-shaped channel are received. A cover 34 is bolted to the upper body 15 to cover the aligned grooves 15a and 23a. With the provision of the cover 34, the wires 10 and 11 are prevented from being disengaged from the grooves 15a and 23a. In other words, the wires 10 and 11 are protected from interfering with the transaxle case 16 and the control valve cover 17. The wires 10 and 11 from the grooves lead to the over drive solenoid 14 mounted to the lower body 23 of the control valve unit.

The other wire harness arrangement associated with a lock-up solenoid 25 (see FIG. 3A) will be described with reference to FIGS. 1, 3A and 3B.

As is seen from FIG. 1, a covered wire 13a from the connector 13, a covered wire 35a from an electric device 35 and a plurality of covered wires 18 to 21 from connectors 44 and 44 are all received in a generally L-shaped guide channel which is defined by four parts, which are an extension of the guide bracket 31 and three guide brackets 36, 37 and 38 each being bolted to the outer surface of the upper body 15. The brackets 36, 37 and 38 have each a vertical flange which is shown crosshatched in the drawing. The bracket 38 has two closure arms 41 and 42 bolted thereto, by which the wires are prevented from being disengaged from the guide channel. The closure arm 41 has an extension to which a rubber clip 39 is fixed for bundling the wires. Designated by numeral 40 is also a rubber clip which is fixed to the upper body 15 to bundle the wires.

Figure 3A:
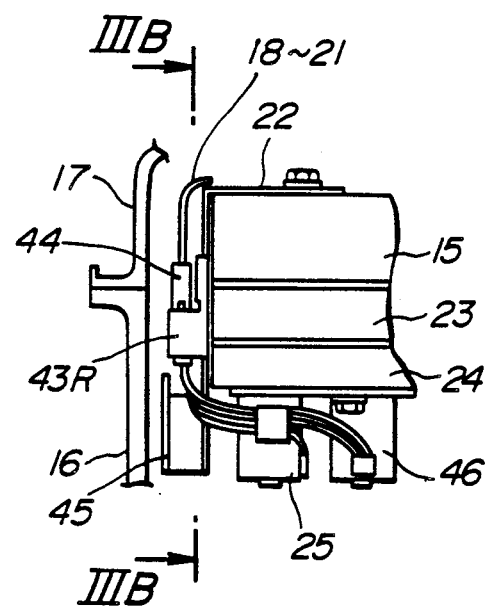
FIG. 3A is a sectional view taken along the line IIIA—IIIA of FIG. 1, showing a wire harness arrangement associated with a lock-up solenoid of the control valve unit.
Figure 3B:
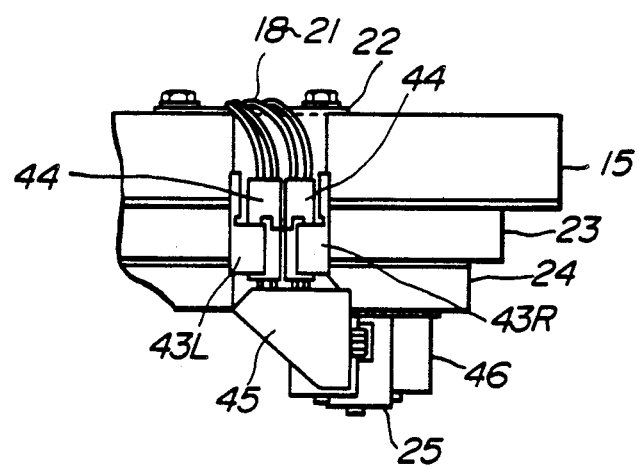
FIG. 3B is a sectional view taken along the line IIIB—IIIB of FIG. 3A.

As may be understood from FIGS. 3A and 3B, the connectors 44 and 44 are detachably held by respective holders 43L and 43R which are connected to the right or left side of the control valve unit through a bracket 22. The bracket 22 is bolted to the upper body 15 of the unit. The bracket 22 has as its lower portion an integral cover 45 by which the wires 18 to 21 from the connectors 44 and 44 are covered. As shown in FIG. 3A, the wires 18 to 21 from the connectors 44 lead to the lock-up solenoid 25 and a certain electric device 46 which are mounted to a lock-up body 24. It is to be noted that, due to provision of the holders 43L, 43R and the cover 45, the wires 18 to 21 are protected from interfering with the transaxle case 16 and the control valve cover 17.

Figure 4A:
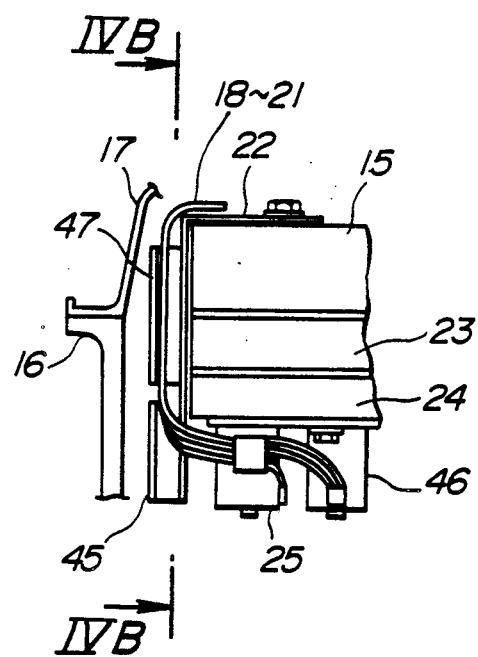
FIG. 4A is a view similar to FIG. 3A, but showing a modification of the wire harness arrangement of FIG. 3A.
Figure 4B:
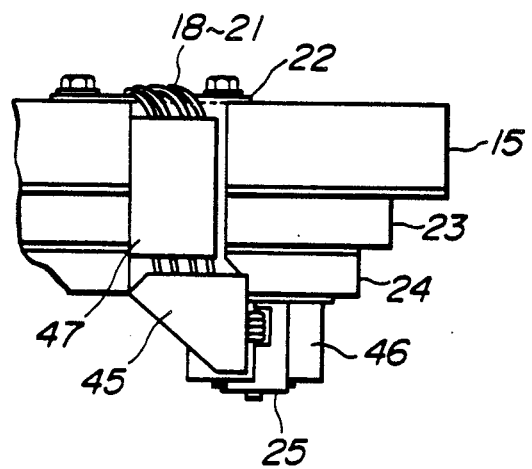
FIG. 4B is a sectional view taken along the line IVB—IVB of FIG. 4A.
Figure 6A:
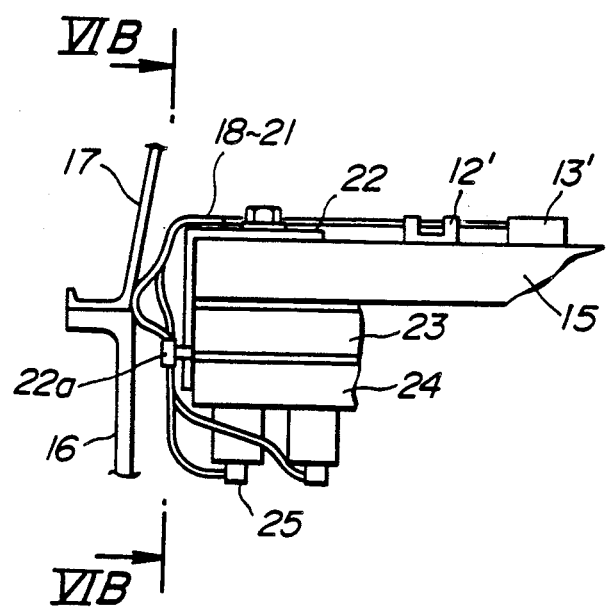
FIG. 6A is a view similar to FIG. 5B, but showing a conventional wire harness arrangement associated with a lock-up solenoid.
Figure 6B:
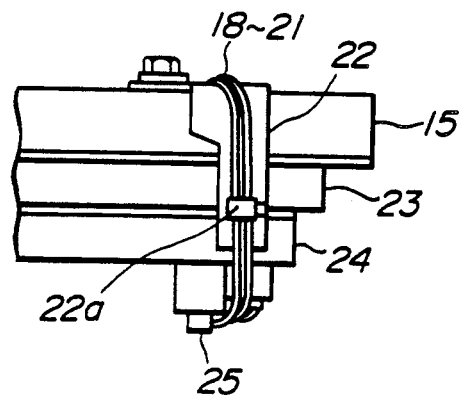
FIG. 6B is a sectional view taken along the line VIB—VIB of FIG. 6A.

Referring to FIGS. 4A and 4B, there is shown a modification of the wire harness arrangement of FIGS. 3A and 3B. In this modification, no connectors, which correspond to the above-mentioned connectors 44 and 44, are possessed by the wires 18 to 21 which extend from the L-shaped channel on the upper body 15. In place of the above-mentioned holders 43L and 43R, a relatively large cover 47 is integrally connected to the bracket 22 for covering the wires 18 to 21 at the left side of the control valve unit.

What is claimed is:

1. In a control valve assembly of an automatic transmission,
a combination comprising:
a body of said control valve assembly, said body having first and second outer surface portions;
covered wires extending from said first outer surface portion through said second outer surface portion;
first means defining on said first outer surface portion at least one guide channel in which said wires extend, with said guide channel preventing lateral movement of said wires on said first outer surface along the length of said wires;
second means for retaining said wires within said guide channel; and
third means for retaining said wires at said second outer surface portion.

2. A combination as claimed in claim 1, in which said first means comprises a plurality of brackets, and vertically extending flanges, mounted on said first outer surface portion in a manner to define therebetween the guide channel.

3. A combination as claimed in claim 2, in which said brackets are bolted to said first outer surface portion.

4. A combination as claimed in claim 2, in which said second means comprises closure arms which are bolted to at least one of said brackets.

5. A combination as claimed in claim 4, in which said third means comprises a cover member which is bolted to said body.

6. A combination as claimed in claim 5, in which third means further comprises at said second outer surface portion a groove into which said wires are received, said cover member covering said groove.

7. A combination as claimed in claim 4, in which said cover member has at its extension portion a holder by which said wires are sustained.

8. A combination as claimed in claim 7, in which said holder of said cover member sustains connectors to which said wires lead.

* * * * *